(12) United States Patent  (10) Patent No.: US 8,141,687 B2
Kagawa  (45) Date of Patent: Mar. 27, 2012

(54) SYSTEM FOR IDENTIFYING TIRE POSITION

(75) Inventor: Hideki Kagawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1320 days.

(21) Appl. No.: 11/756,467

(22) Filed: May 31, 2007

(65) Prior Publication Data

US 2008/0051963 A1  Feb. 28, 2008

(30) Foreign Application Priority Data

May 31, 2006  (JP) ................................ 2006-152344

(51) Int. Cl.
*B60C 23/00*  (2006.01)

(52) U.S. Cl. ................ 188/1.11 E; 303/20; 303/191; 340/445; 73/146

(58) Field of Classification Search ............... 73/146, 73/146.2; 340/442–445; 701/29; 303/194, 303/195, 191; 188/1.11 E
See application file for complete search history.

(56) References Cited

U.S. PATENT DOCUMENTS 5,531,110 A * 7/1996 Ohashi et al. .................. 73/146
2004/0217854 A1 * 11/2004 Hirohama et al. ............ 340/445

FOREIGN PATENT DOCUMENTS

| JP | 8-227492 A | 9/1996 |
| JP | 2003-237329 A | 8/2003 |
| JP | 2004-224160 A | 8/2004 |
| JP | 2005-147709 A | 6/2005 |

OTHER PUBLICATIONS

Notification of Reason for Refusal dated Dec. 8, 2011, issued in counterpart Japanese Application No. 2006-152344.

* cited by examiner

*Primary Examiner* — Christopher Schwartz
(74) *Attorney, Agent, or Firm* — Sughrue Mion, PLLC

(57) ABSTRACT

A system includes a first detector, second detector and processor section. The first detector is provided to a first wheel in a first position in a vehicle. The second detector is provided to a second wheel in a second position in the vehicle. The vehicle includes a brake system configured to brake the first wheel in response to a signal designating the first position. The first detector is assigned with a first identifier and the second detector is assigned with a second identifier. The first detector is configured to output the first identifier to the processor section, in response to a change in rotation of the first wheel. The second detector is configured to output the second identifier to the processor section, in response to a change in rotation of the second wheel. The processor section is configured to output the signal to the brake system, to associate the first identifier and a first position data indicating the first position and to identify a first tire mounted on the first wheel based on the first identifier.

11 Claims, 10 Drawing Sheets

SYSTEM FOR IDENTIFYING TIRE POSITION

BACKGROUND OF THE INVENTION

1. Field of the Invention

The present invention relates to a system for identifying a position of a tire provided in a vehicle.

2. Description of Related Art

In recent years, regulations with regard to vehicle safety have been enhanced both in Japan and United States. According to the TREAD (Transportation Recall Enhancement Accountability and Document) act, new automobile to be marketed in North America in future will be required to be equipped with a TPMS (tire pressure monitoring system). Such a system (TPMS) is effective in improving automobile safety. Therefore, it is recommended that automobile marketed outside North America be equipped with this system.

FIG. 1 is a block diagram showing a TPMS disclosed in Japanese Laid Open patent Application (JP-A-Heisei8-227492). Referring to FIG. 1, the TPMS 100 is provided with a sensor 1 for each wheel of a vehicle, a detection unit 2 for each sensor 1 and a monitor unit 103. The detection unit 2 is placed in the body section of the vehicle to face toward the sensor 1. A driver in the vehicle can watch the monitor unit 103. The sensor 1 detects air pressure of a tire mounted on the wheel. A detection result acquisition section 121 of the detection unit 102 acquires the detection result from the sensor 1. A data generator section 122 of the detection unit 102 converts the detection result into a digital data and provides the digital data with an ID (identification) code assigned to the detection unit 102. A transmitter section 123 of the detection unit 102 transmits the digital data with the ID code as radio wave signal, A receiver section 131 of the monitor unit 103 receives the radio wave signal. A CPU 132 of the monitor unit 103 makes a display section 133 to display the detection result. When the detection result indicates a warning condition of the tire, the CPU 132 makes an alarm section 134 to raise the alarm.

The sensor 101 is provided in the tire mounted on each wheel. Therefor, air pressures of all tires of the vehicle can be monitored individually and accurately.

When the tire condition is monitored by using the TPMS described above, it is required to identify positions of tires in a vehicle. Japanese Laid Open patent Applications (JP-P2004-224160A) and (JP-P2005-147709A) disclose arts to identify positions of tires.

FIG. 2 is a block diagram showing a TPMS disclosed in Japanese Laid Open patent Application (JP-P2004-224160A). Referring to FIG. 2, the TPMS includes sensors 215 to 218, receiver sections 211 to 214, a controller 205, a display 206 and an alarm lamp 207. The sensors 215 to 218 are provided respectively to tires 201 to 204 of a vehicle 200. The receiver sections 211 to 214 are provided in a main body 210 of the vehicle 200. The receiver sections 211 to 214 are provided respectively in vicinities of the tires 201 to 204. Each of the sensors 215 to 218 detects air pressure of the corresponding tire and transmits through air a signal indicating the air pressure and an identification code assigned to that tire. The receiver sections 211 to 214 receive the signal and provide the air pressure data and the identification code to the controller 205. Here, the signal transmitted from the sensor 211 is received by each of the receiver sections 211 to 214. The tire 201 with which the signal is concerned is identified as a tire in the vicinity of the receiver section 211 by comparing intensity of the signal received by each of the receiver sections 211 to 214.

FIG. 3 shows a flow chart of a method for identifying tire position disclosed in Japanese Laid Open patent Application (JP-P2005-147709A). In a system concerned with the method, sensor units are respectively provided to wheels of a vehicle. Each of sensor units includes an acceleration sensor and transmits through air a signal indicating a time (called as detected time) required for one rotation of the corresponding wheel, an identifier and an air pressure of a tire mounted on the corresponding wheel. A receiver receives the signal from each of the sensor units and sends data corresponding to the signal to the controller. The receiver is installed in the front region of the vehicle. The controller judges whether each of the sensor units is provided to the front wheel or the rear wheel of the vehicle based on the intensity of the signal. Referring to FIG. 3, in steps S1 and S2, a controller compares a steering angle of the vehicle with a predetermined value at every reception of the signal from the sensor unit. In step S3, when the steering angle is larger than the predetermined value, the controller calculates a time (called as calculated time) required for one rotation of the wheel based on speed of the vehicle and size of the tire. In step S4 and S5, the controller compares the calculated time with the detected time. In step S6, when the calculated time is longer than the sum of the detected time and a predetermined time, the controller judges the sensor unit as a sensor unit provided to the outside wheel. In step S7, when the calculated time is shorter than the difference calculated by subtracting the predetermined time from the detected time, the controller judges the sensor unit as a sensor unit provided to the inside wheel. In step S8, the controller judges whether the outside (inside) wheel is the left wheel or right wheel based on the direction of turn of the vehicle.

The present inventor has recognized that according to the TPMS disclosed in Japanese Laid Open patent Application (JP-A-Heisei8-227492), it is difficult to identify automatically the positions of tires. Because not specified is a correspondence between the position of the detection unit and the ID code.

The present inventor has also recognized that according to the TPMS disclosed in Japanese Laid Open patent Application (JP-P2004-224160A), the same number of the receiver sections as the number of the wheels are required. The plurality of receiver sections increases the number of parts required for manufacturing the vehicle with the TPMS. Moreover, lines are also required for connecting the receiver sections with the controller. These factors may increase the manufacturing cost for the vehicle.

The present inventor has also recognized that according to the method disclosed in Japanese Laid Open patent Application (JP-P2005-147709A), the position of the tire can be identified only during the turn of the vehicle. The place in which the receiver should be installed is restricted in order to judge whether each of the sensor units is provided to the front wheel or the rear wheel of the vehicle based on the intensity of the signal. Moreover, the controller requires data indicating whether the receiver is installed in the front region or rear region of the vehicle.

SUMMARY

In one embodiment, a system includes a first detector, second detector and processor section. The first detector is provided to a first wheel in a first position in a vehicle. The second detector is provided to a second wheel in a second position in the vehicle. The vehicle includes a brake system configured to brake the first wheel in response to a signal designating the first position. The first detector is assigned with a first identifier and the second detector is assigned with a second identifier. The first detector is configured to output the first identifier to the processor section, in response to a change in rotation of the first wheel. The second detector is configured to output the second identifier to the processor section, in response to a change in rotation of the second wheel. The processor section is configured to output the signal to the brake system, to associate the first identifier and a first position data indicating the first position and to identify a first tire mounted on the first wheel based on the first identifier.

In another embodiment, a method includes a selecting step, braking step, detecting step, transmitting step, receiving step, storing step and identifying step. In the selecting step, a first position is selected from positions in each of which a wheel of a vehicle is installed. In the braking step, a brake installed in the first position brakes the wheel in the first position. In the detecting step, a change in condition of the wheel in the first position is detected in response to the braking. In the transmitting step, a first identifier corresponding to the wheel in the first position is transmitted in response to the detecting. In the receiving step, the first identifier is received. In the storing step, the first identifier and a position data indicating the first position are stored in association with each other. In the identifying step, a tire mounted on the wheel in the first position is identified based on the first identifier.

In further another embodiment, a computer-readable software product for a method which includes a selecting step, braking step, detecting step, transmitting step, receiving step, storing step and identifying step. In the selecting step, a first position is selected from positions in each of which a wheel of a vehicle is installed. In the braking step, a brake installed in the first position brakes the wheel in the first position. In the detecting step, a change in condition of the wheel in the first position is detected in response to the braking. In the transmitting step, a first identifier corresponding to the wheel in the first position is transmitted in response to the detecting. In the receiving step, the first identifier is received. In the storing step, the first identifier and a position data indicating the first position are stored in association with each other. In the identifying step, a tire mounted on the wheel in the first position is identified based on the first identifier.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
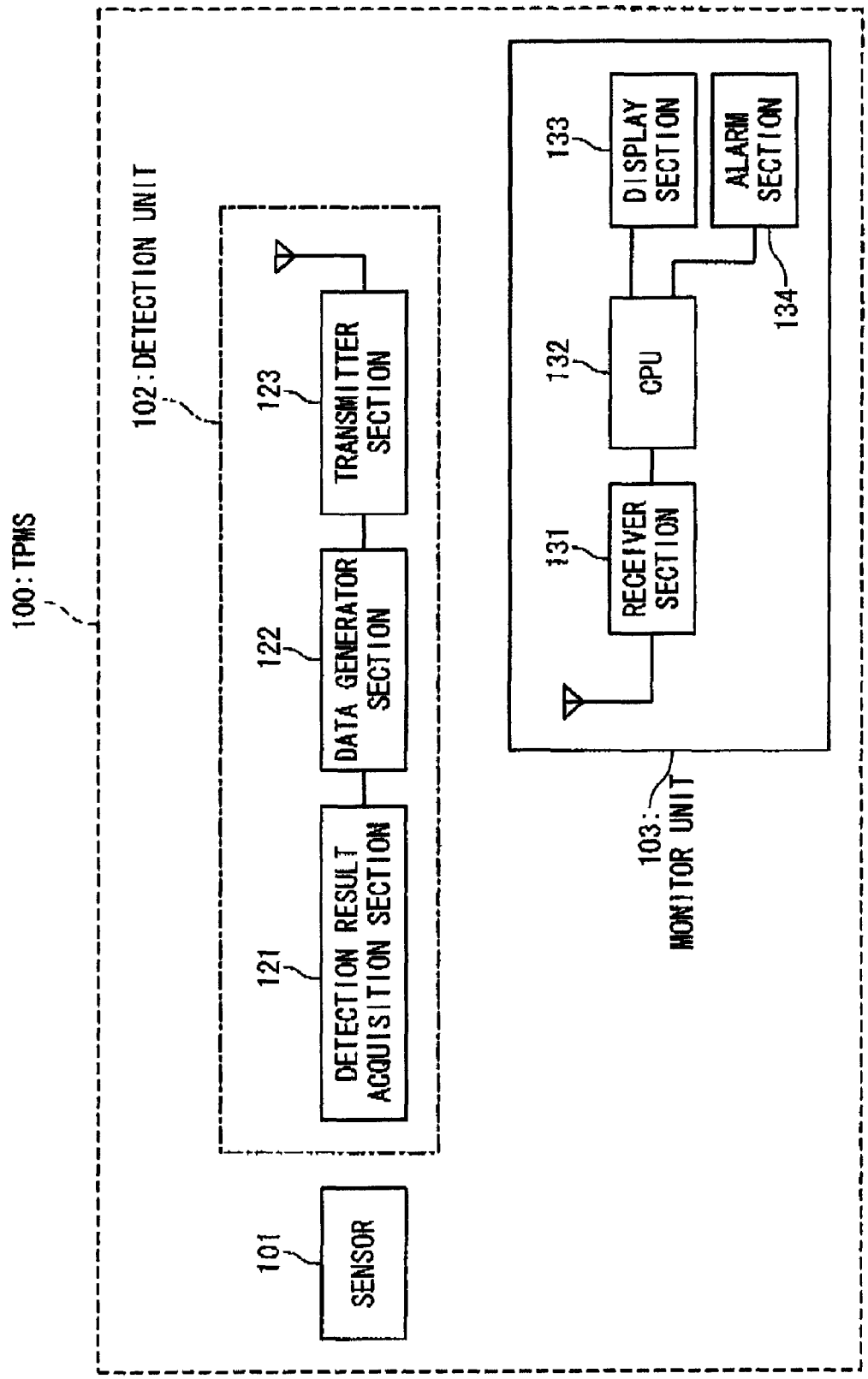
FIG. 1 is a block diagram illustrating a related art.
Figure 2:
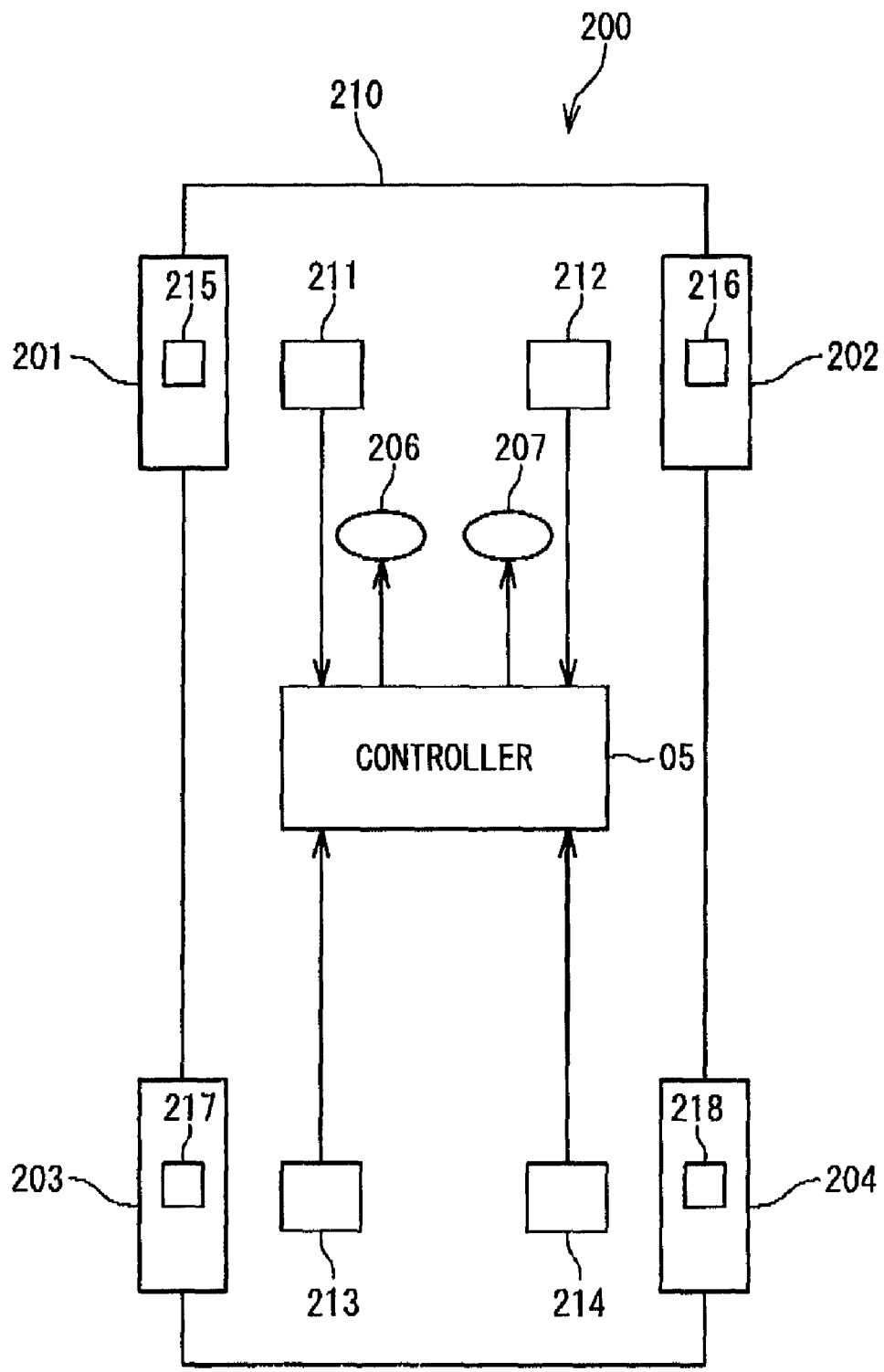
FIG. 2 is a block diagram illustrating another related art.
Figure 3:
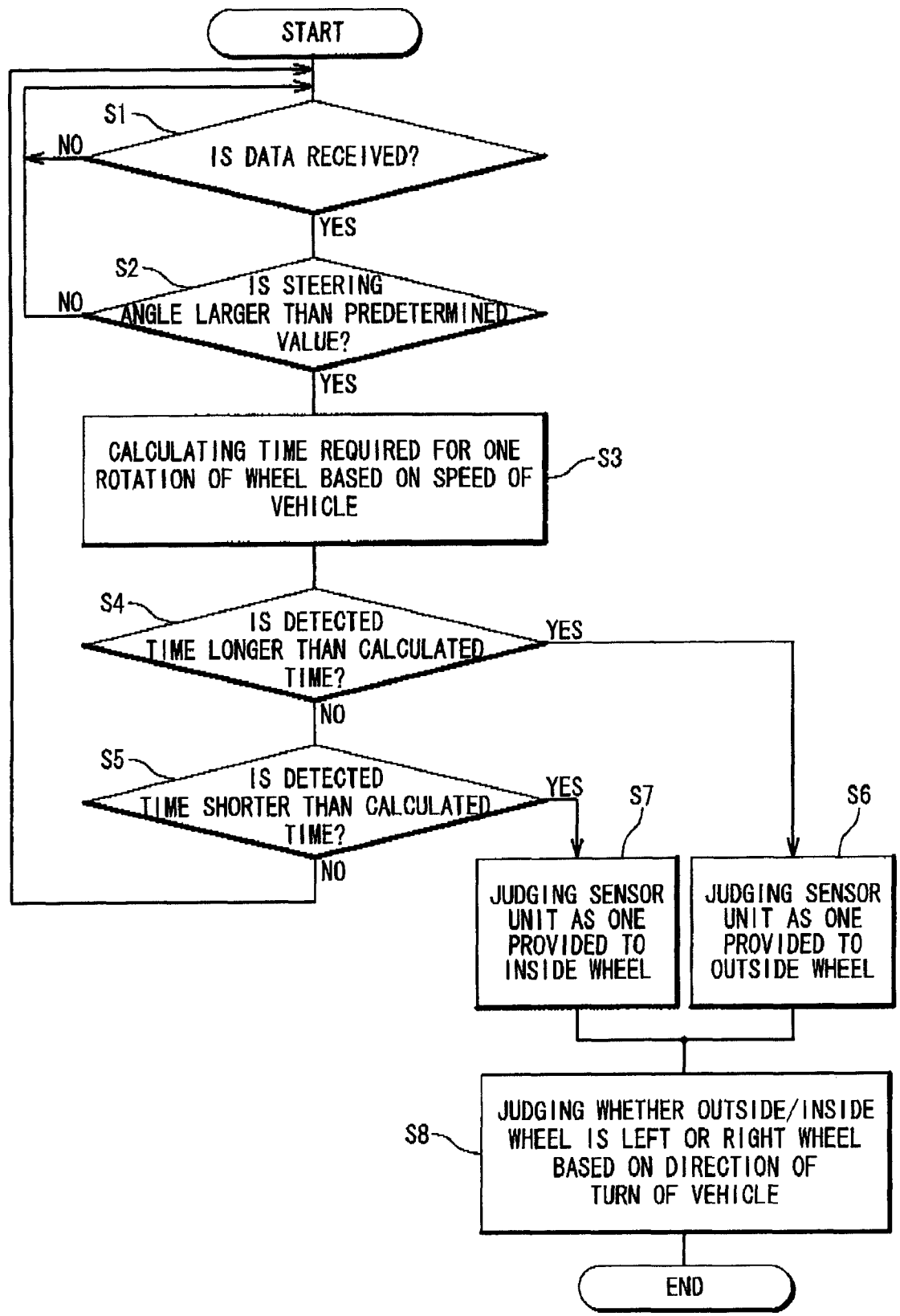
FIG. 3 is a flow chart illustrating still another related art.
Figure 4:
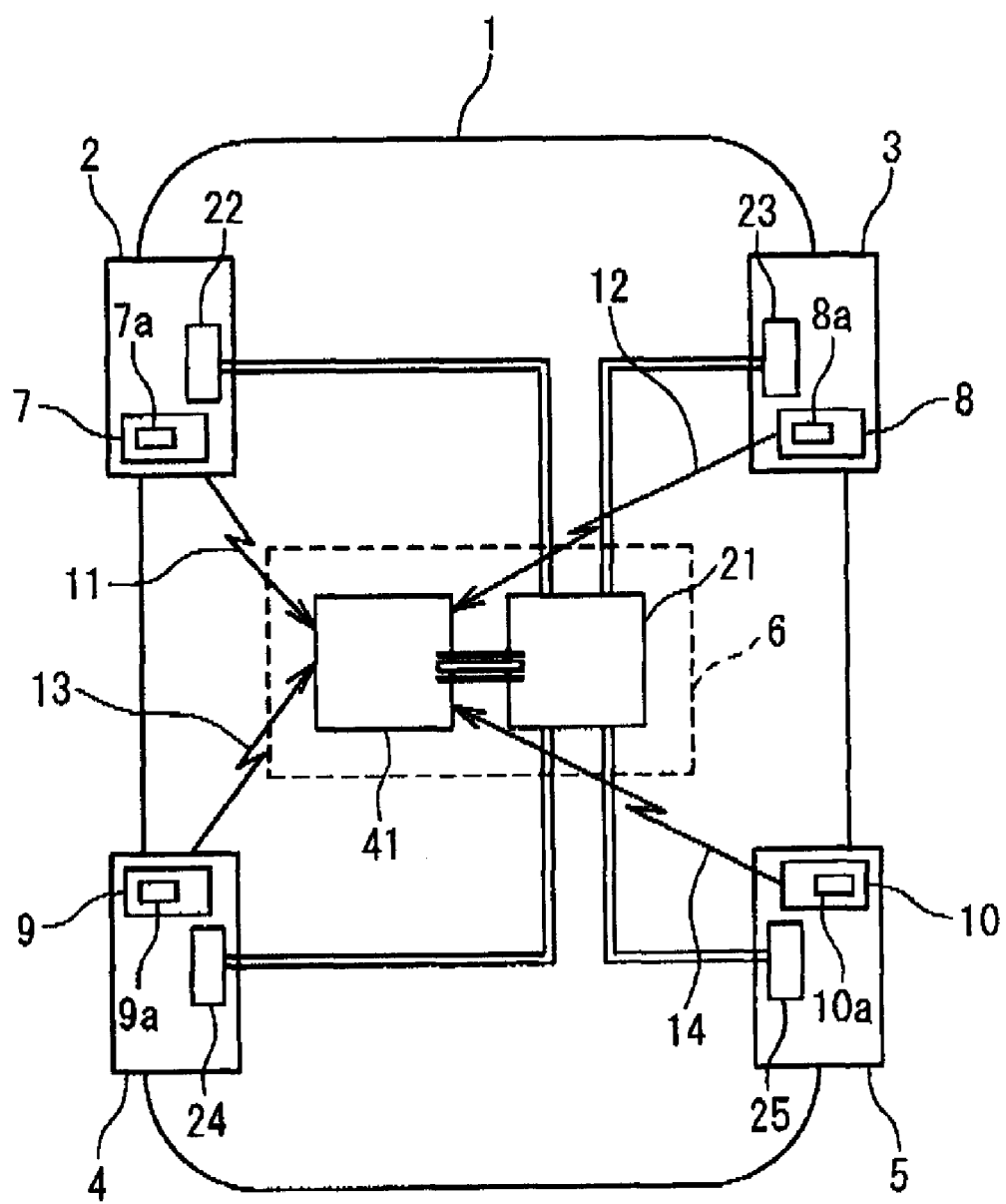
FIG. 4 is a block diagram illustrating a configuration of a system for identifying tire position according to a first embodiment of the present invention.

FIG. 4 is a block diagram illustrating a constitution of a system for identifying tire position according to a first embodiment of the present invention. The system according to the present embodiment is applicable to a vehicle provided with a plurality of wheels (tires). Hereinafter, the system according to the present embodiment is described referring to a case in which the system is applied to a four-wheeled car. This, however, does not mean that the present invention is applicable only to a car.

Referring to FIG. 4, the system according to the present embodiment includes a main body 1 and wheels 2 to 5 of a vehicle. A tire is mounted on each of wheels 2 to 5. The wheel and the tire mounted thereon may be designated by the same numeral. The main body 1 is provided with a processor section 6, which controls the wheels 2 to 5.

The wheels 2 to 5 are a left front wheel 2, right front wheel 3, left rear wheel 4 and right rear wheel 5. The wheels 2 to 5 are provided with sensors 7 to 10, respectively. Each of sensors 7 to 10 is provided inside of the tire mounted on one of wheels 2 to 5. The left front wheel 2 is provided with the left front wheel sensor 7. Similarly, the right front wheel 3 is provided with the right front wheel sensor 8. Further, the left rear wheel 4 is provided with the left rear wheel sensor 9. The right rear wheel 5 is provided with the right rear wheel sensor 10. The sensors 7 to 10 and the wheels (tires) 2 to 5 have one-to-one correspondence. Each of the sensors 7 to 10 monitors conditions of the corresponding tire and wheel. The conditions include, for example, air pressures and air temperature of the tire. The conditions also include rotation rate and angular acceleration of the wheel (tire). In the explanation below, the sensors independently monitor the changes in accelerations of the wheels (tires).

Each of the sensors 7 to 10 is assigned with an identifier (hereinafter called as "sensor ID") for identifying each sensor. In the explanation below, the sensor ID assigned to the left front wheel sensor 7 is called as the left front wheel sensor ID 7a. Similarly, the sensor ID assigned to the right front wheel sensor 8 is called as the right front wheel sensor ID 8a. Further, the sensor ID assigned to the left rear wheel sensor 9 is called as the left rear wheel sensor ID 9a. The sensor ID assigned to the right rear wheel sensor 10 is called as the right rear wheel sensor ID 10a.

Here, the sensors 7 to 10, upon detection of the change in acceleration of the wheels (tires), generate data 11 to 14, each of which indicates the detection of the change in acceleration. Each of the sensors 7 to 10 outputs the data by transmitting radio wave signal. As shown in FIG. 4, the left front wheel sensor 7 outputs the left front wheel data 11 accompanied by the sensor ID 7a. Similarly, the right front wheel sensor 8 outputs the right front wheel data 12 accompanied by the sensor ID 8a. Further, the left rear wheel sensor 9 outputs the left rear wheel data 13 accompanied by the sensor ID 9a. The right rear wheel sensor 10 outputs the right rear wheel data 14 accompanied by the sensor ID 10a.

Each of the wheels 2 to 5 is provided with one of controllers 22 to 25 which controls the rotation of the wheel (tire). In the explanation below, the controllers 22 to 25 are brakes. Referring to FIG. 4, the left front wheel 2 is provided with the left front wheel brake 22. Similarly, the right front wheel 3 is provided with the right front wheel brake 23. Further, the left rear wheel 4 is provided with the left rear wheel brake 24. The right rear wheel 5 is provided with the right rear wheel brake 25.

Generally speaking, a controller (hereinafter called as brake) for controlling rotation of the wheel (tire) is directly connected to the wheel (tire). Therefore, when a user of the vehicle presses a brake pedal of the vehicle, each of the brakes 22 to 25 presses instantaneously brake pads against brake discs fixed to the wheels.

Referring to FIG. 4, the processor section 6 includes a tire control unit 21 and a TPMS (Tire Pressure Monitoring System) control unit 41. The tire control unit 21 controls each of the brakes 22 to 25 independently. The TPMS control unit 41 receives the data 11 to 14 and then identifies positions of the wheels (tires) 2 to 5 based on the data 11 to 14. The TPMS control unit 41 monitors the data 11 to 14 in real time.

Figure 5:
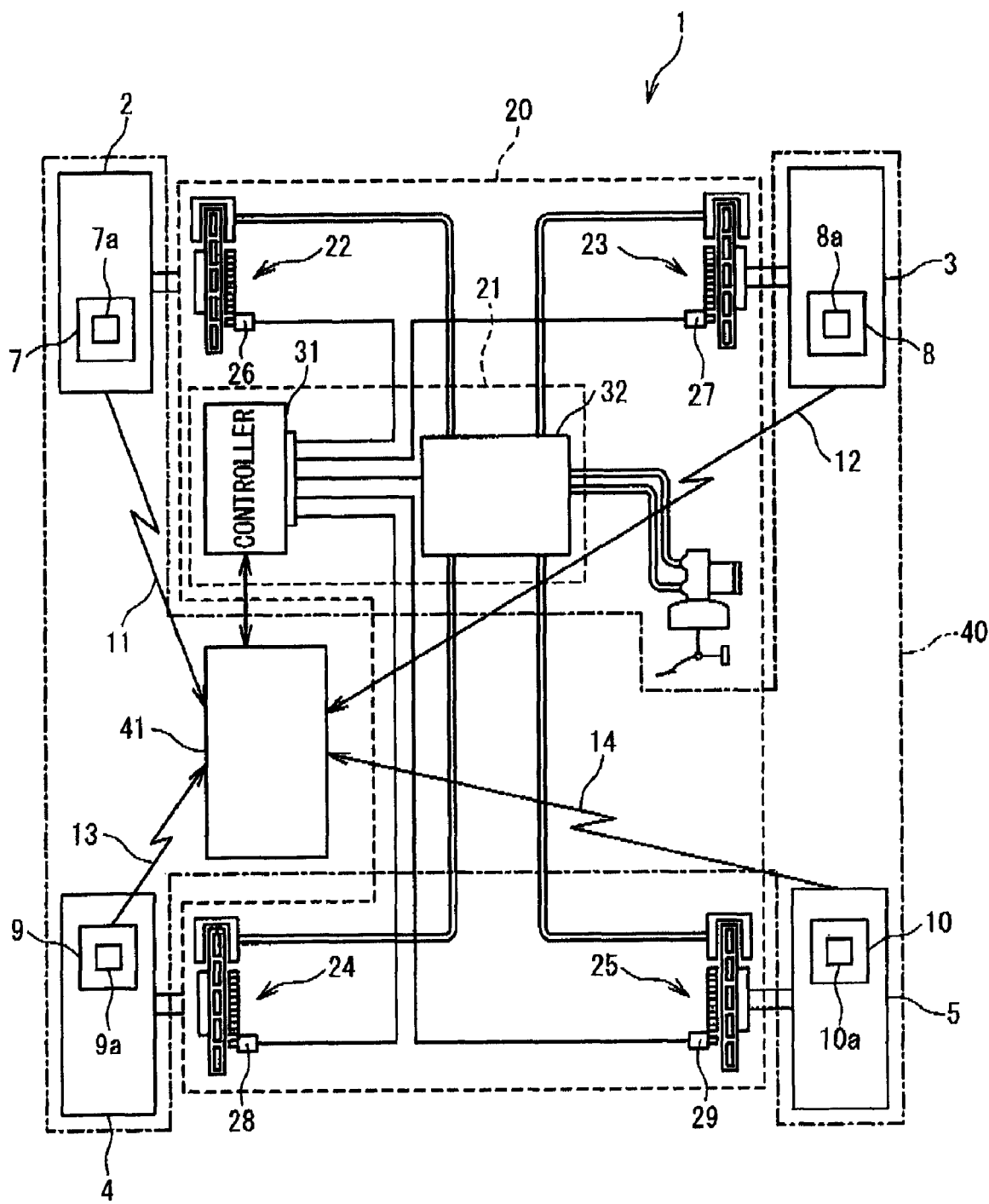
FIG. 5 is a block diagram illustrating a detailed configuration of the system according to the first embodiment.

Hereinafter, a detailed configuration of the main body 1 will be described referring to the drawings. FIG. 5 is a block diagram illustrating the detailed configuration of the main body 1. In the present embodiment, the main body 1 includes an ABS (Anti-lock Brake System) 20 and a TPMS (Tire Pressure Monitoring System) 40. The ABS 20 and the TPMS 40 cooperate each other.

Referring to FIG. 5, the ABS 20 includes the tire control unit 21 and the brakes 22 to 25. The brakes 22 to 25 control rotations of the wheels (tires) 2 to 5 in response to commands from the tire control unit 21. The tire control unit 21 includes an ABS controller 31 and an actuator 32. The brakes 22 to 25 are related to wheel sensors 26 to 29, respectively. The wheel sensors 26 to 29 detect rotation conditions of the wheels (tires) 2 to 5, respectively. As shown in FIG. 5, the left front wheel sensor 26 detects a rotation condition of the left front wheel 2. Similarly, the right front wheel sensor 27 detects a rotation condition of the right front wheel 3. Further, the left rear wheel sensor 28 detects a rotation condition of the left rear wheel 4. The right rear wheel sensor 29 detects a rotation condition of the right rear wheel 5.

Each of the wheel sensors 26 to 29 is connected to the ABS controller 31. The ABS controller 31, in response to detection signals outputted from the wheel sensors 26 to 29, outputs to the actuator 32, control signals for individually controlling the wheels (tires) 2 to 5. The actuator 32 supplies, to the brakes 22 to 25 via brake pipes, hydraulic pressures for operating the brakes 22 to 25, respectively. The actuator 32 can independently supply hydraulic pressures to the respective brakes 22 to 25. Therefore, the actuator 32 can operate the brakes 22 to 25 in different timings. The actuator 32 can also brake the four wheels 2 to 5 simultaneously in response to a signal from the brake pedal.

In the present embodiment, the wheels (tires) 2 to 5 are connected to a differential (not shown) via a constant velocity joint section (not shown). In addition, the wheels (tires) 2 to 5 are connected to a suspension section (not shown) for absorbing vibrations. Thus, a change in condition of one of the wheels (tires) 2 to 5 induces a change in condition of each of the other three with time lags via the constant velocity joint section, the suspension section. The air pressures of the tires may make effects on the time lags.

Therefore, the sensors 7 to 10 output the data 11 to 14, which indicate the changes in conditions of the wheels (tires), at different timings. As described above, the TPMS control unit 41 receives the data 11 to 14 outputted from the respective sensors 7 to 10. The TPMS control unit 41, based on the timings (orders) in which the data 11 to 14 are received, identifies the positions of the wheels (tires) 2 to 5. The TPMS control unit 41 will be described in detail hereinafter.

Figure 6:
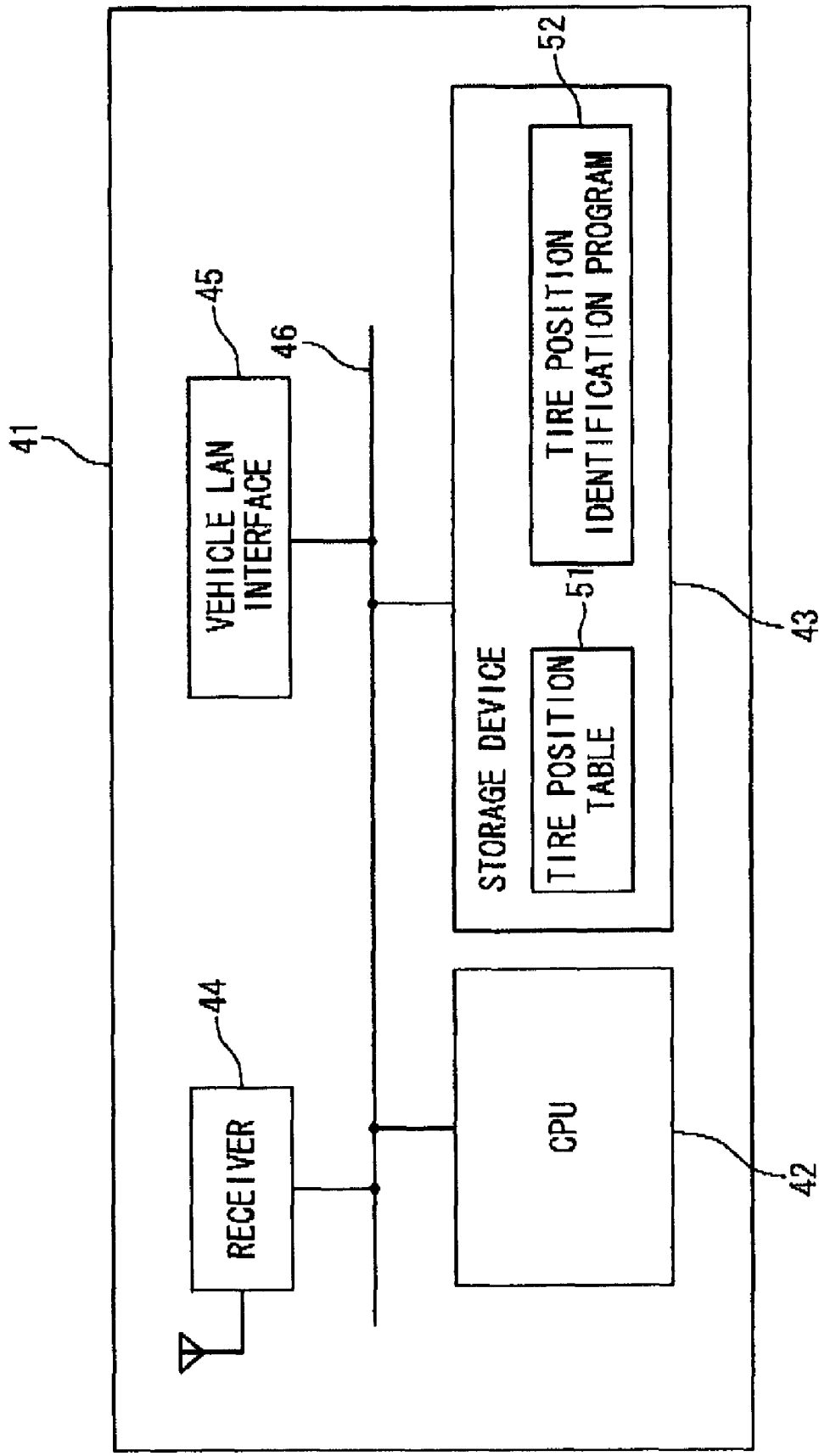
FIG. 6 is a block diagram illustrating a configuration of a TPMS controller unit.

FIG. 6 is a block diagram illustrating a configuration of the TPMS control unit 41. In the present embodiment, the TPMS control unit 41 is constituted as a single tip IC (integrated circuit). Referring to FIG. 6, the TPMS control unit 41 includes a CPU 42, a storage device 43, a receiver 44, and a vehicle LAN (Local Area Network) interface 45, which are connected together via an internal bus 46. The CPU 42 controls the devices installed in the TPMS control unit 41 and performs data processing. The CPU 42 interprets data received via the internal bus 46, performs calculation based on the data, and then outputs the results of the calculation to the certain device. The storage device 43 includes a storage medium for storing data, which can be processed by a computer. In the present embodiment, it is preferable that the storage device 43 can rewrite the data stored therein.

The receiver 44 receives the data 11 to 14 outputted from the sensors 7 to 10 described above. The receiver 44 outputs the data after converting the data into a data format that can be processed by the CPU 42. The vehicle LAN interface controls connections of the TPMS control unit 41 with each of electronic devices provided in the main body 1. The main body 1 is provided with, in addition to the system for identifying tire position, various systems that are concerned about the driving of the vehicle. These systems are connected to a vehicle LAN (not shown) which is an intra network of the vehicle. The TPMS control unit 41 is connected to a display (not shown) and an alarm (not shown) via the vehicle LAN.

In the present embodiment, the display shows the position and condition (for example, air pressure and temperature) of each of the tires. Upon detection of a danger such as flat tire in the vehicle, the alarm raises an alarm to notify the user about the danger.

As shown in FIG. 6, the storage device 43 holds a tire position table 51 and a tire position identification program 52. The tire position table 51 is generated in the identification of tire position according to the present embodiment. A configuration of the tire position table 51 will be described below. The tire position identification program 52 is a computer program describing procedures executed by the system for identifying tire position according to the present embodiment. In the present embodiment, the CPU 42 generates the tire position table 51 in the procedures described in the tire position detection program 52.

Figure 7:
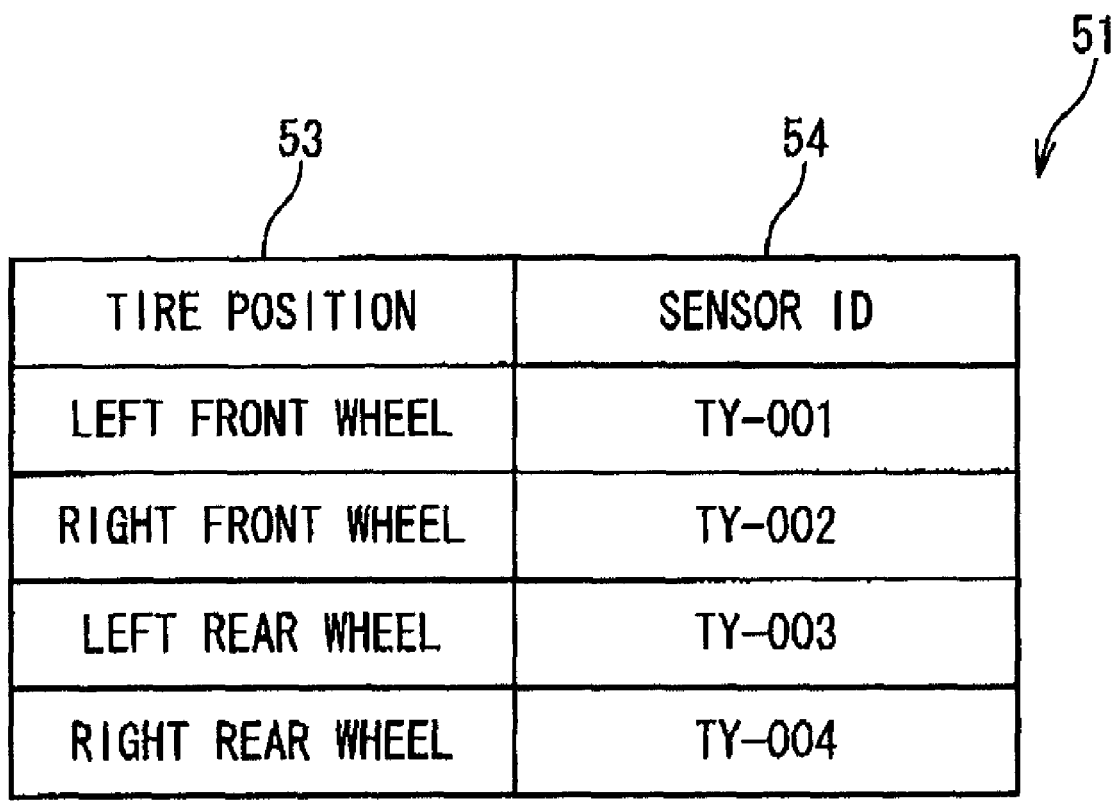
FIG. 7 illustrates a configuration of a tire position table.

FIG. 7 is a diagram illustrating the configuration of the tire position table 51. Referring to FIG. 7, the tire position table 51 includes tire positions 53 and sensor IDs 54. Each of the sensor IDs 54 is associated with one of tire positions 53. Each of tire positions 53 and one of the tires in the vehicle have one-to-one correspondence. As shown in FIG. 7, the tire position table 51 holds this correspondence. The TPMS control unit 41 confirms the position of each of the tires to show the conditions of the tires by referring to the tire position table 51. The TPMS control unit 41 controls the display to show the position and condition of each of the tires in a manner in which the position of one tire is associated with the condition of that tire.

Figure 8:
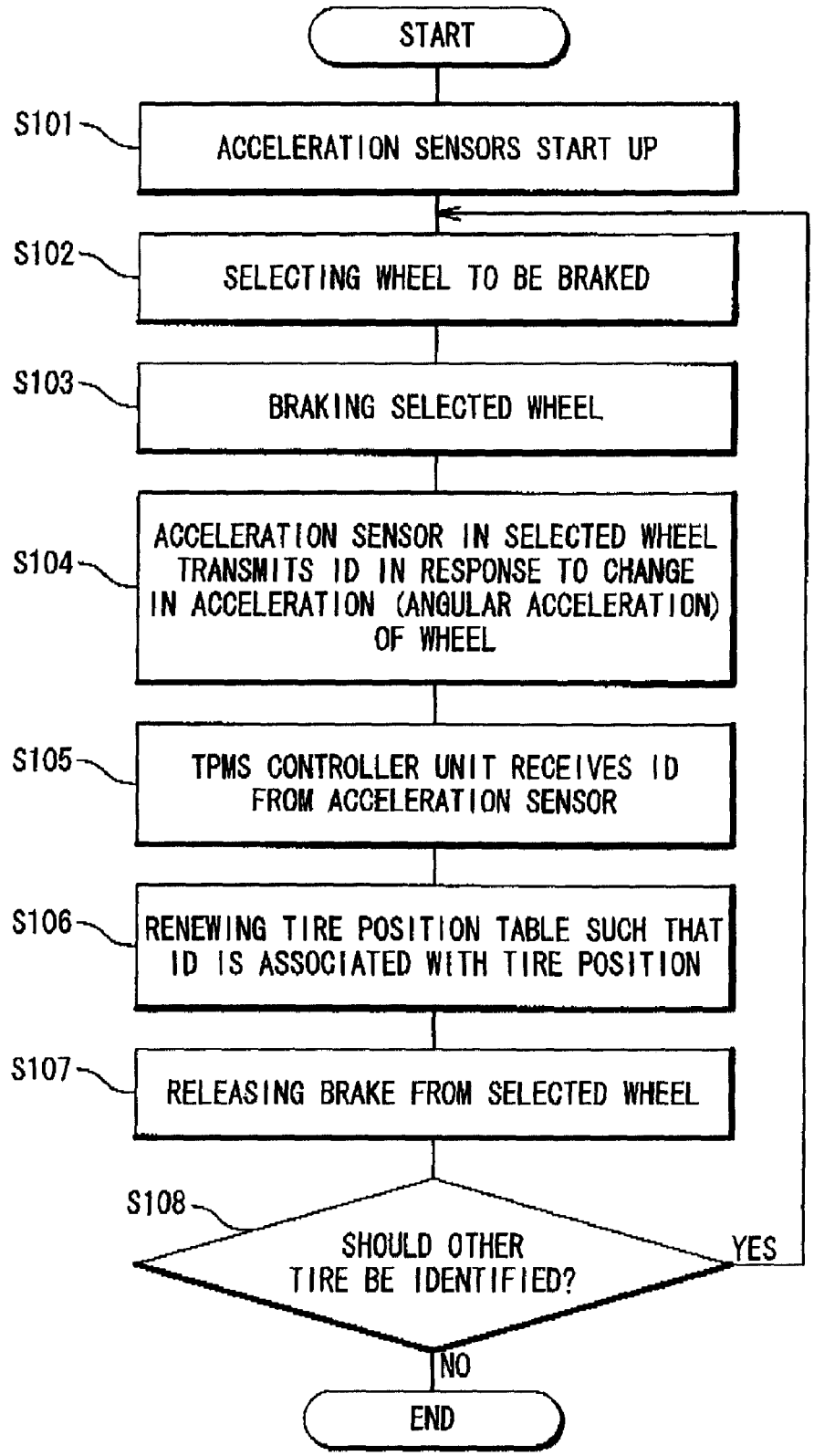
FIG. 8 is a flow chart illustrating a operation of the system according to the first embodiment.

FIG. 8 is a flow chart illustrating an operation of the tire position identification system according to the present embodiment. In the operation shown in FIG. 8, the CPU 42 generate or rewrite the tire position table 51 in accordance with the procedures described in the tire position identification program 52. The operation is executed after start of an engine of the vehicle. The system for identifying tire position starts the operation in response to the start of the engine.

In the present embodiment, batteries provided in the vehicle supply power to the sensors 7 to 10. Therefore, in the tire pressure monitoring system 40, the batteries stop supplying power in order to reduce power consumption when the vehicle (engine) is stopped. In step S101, the main body 1 rotates the wheels 2 to 5 to start running. In response to the starts of rotations of the wheels 2 to 5, the sensors 7 to 10 start up.

In step S102, the TPMS control unit 41 starts up in response to the start of the engine. Upon the starting up of the TPMS control unit 41, the CPU 42 reads in the tire position identification program 52 from the storage device 43. The CPU 42, in accordance with the procedures described in the tire position identification program 52, selects one wheel (tire) from the wheels (tires) 2 to 5 and specifies the selected wheel (tire) as a wheel (tire) to be braked.

In step S102, the TPMS control unit 41 outputs data (signal) indicating the position of the selected wheel (tire) and a command for braking only the selected wheel (tire) to the ABS controller 31. The position of the selected wheel (tire) means that the selected wheel (tire) is left front, right front, left rear or right rear wheel (tire) in the vehicle.

In step S103, the ABS controller 31, in response to the data and command, supplies to the actuator 32 a control signal for applying the brake to the selected wheal (tire) The actuator 32, in response to the control signal, applies the brake to the selected wheel.

In step S104, the sensor (hereinafter called as selected wheel sensor) which is provided to the selected wheel (tire) detects a change in acceleration of the selected wheel (tire). The selected wheel sensor, in response to the detection of the change, transmits to the TPMS controller unit 41 data indicating the sensor ID (hereinafter called as selected wheel sensor ID) assigned to the selected wheel sensor.

In step S105, the receiver 44 of the TPMS control unit 41 receives the data from the selected wheel sensor. The TPMS control unit 41, based on the data received, recognizes the selected wheel sensor ID. As described above, the wheels 2 to 5 are connected to the constant velocity joint section and suspension section. Therefore, when only the selected wheel is braked, accelerations of the other three wheels start changing after the acceleration of the selected wheel starts changing.

In step S106, the TPMS control unit 41 renews the tire position table 51 such that the renewed tire position table 51 relates the position of the selected wheel with the selected wheel sensor ID. The selected wheel sensor ID is indicated by the data of the earliest reception after the output of the command for applying the brake to the selected wheel. As described above, the selected wheel sensor transmits the data indicating change in acceleration of the selected wheel before the other three sensor transmit data indicating changes in accelerations of the other three wheels. Therefore, the earliest data among data received by the receiver 44 from the sensors 7 to 10 is the data outputted from the selected wheel sensor. Consequently, the earliest data indicates the selected wheel sensor ID. The receiver 44 supplies the data received from the selected wheel sensor to the CPU 42 after converting that data into the data format described above. The CPU 42 renews the tire position table 51 based on the earliest data among data supplied from the receiver 44 after output of the command for braking.

In step S107, the TPMS control unit 41, in response to the completion of renewal of the tire position table 51, commands the ABS controller 31 to release the brake from the selected wheel. The ABS controller 31, in response to the command, supplies the actuator 32 with a control signal for releasing the brake from the selected wheel. The actuator 32, in response to the control signal, releases the brake from the selected wheel. The release of the brake may be performed after the transmission of the data in step S104 and before step S106.

In step S108, the TPMS control unit 41 judges whether or not the identification of position is completed for the other wheels (tires). When it is judged that the identification of position is not completed for at least one wheel (tire), the system returns to the step S102. When it is judged that the identification of position is completed for all of the wheels (tires) 2 to 5, the system ends the operation for identifying tire position.

Figure 9A:
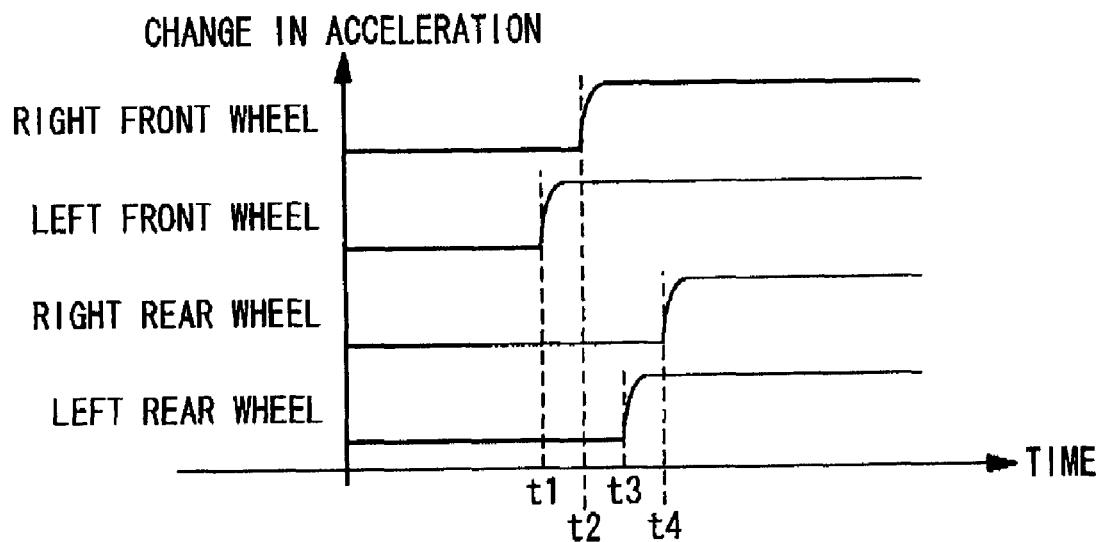
FIG. 9A is a timing chart illustrating changes in accelerations of wheels of the vehicle during the operation.
Figure 9B:
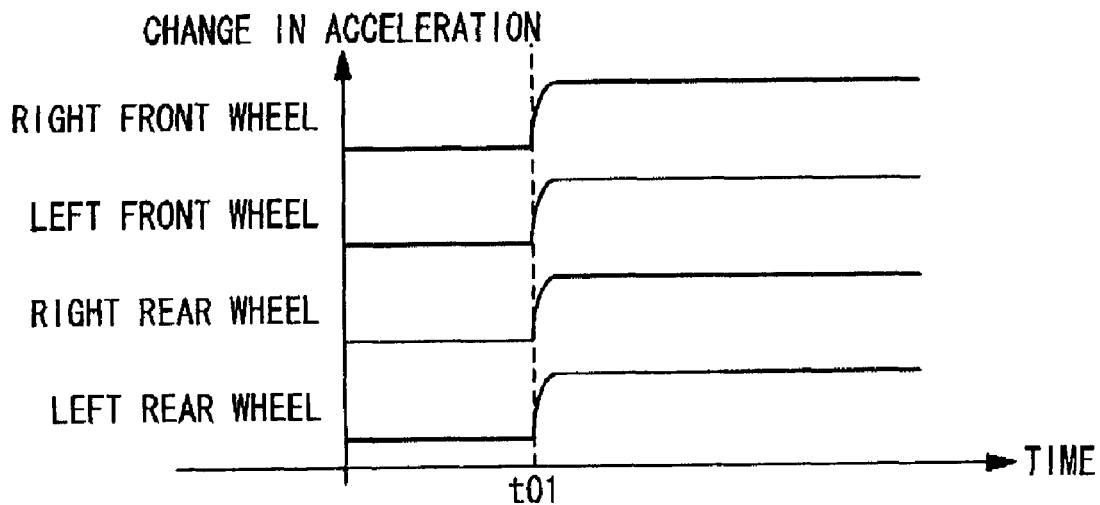
FIG. 9B is a timing chart illustrating changes in accelerations of the wheels induced by a normal braking operation.

Hereinafter, the change in acceleration of each of the wheels (tires) 2 to 5 during the operation will be described. FIG. 9A is a timing chart showing change in acceleration of each of the wheels (tires) 2 to 5 when the brake is applied only to the selected wheel (tire) based on the sensor IDs 54. FIG. 9A shows the changes when the identification of tire position according to the present invention is executed. FIG. 9B is a timing chart for the reference, which shows change in acceleration of each of the wheels 2 to 5 when the brake is applied to each of the wheels 2 to 5 in response to the press of the brake pedal in a normal braking operation. In FIGS. 9A and 9B, the vertical axis indicates change in acceleration and the horizontal axis indicates time.

The timing chart of FIG. 9A shows the chances in a case in which the TPMS control unit 41 selects and specifies the left front wheel 2 as the wheel to be braked. At timing T1, the left front brake 22 applies the brake to the left front wheel 22, resulting in instantaneous change in acceleration of the left front wheel 22. Here, each of the wheels 2 to 5 is connected to the main body 1 via the suspension section and constant velocity joint section. Thus, as shown in FIG. 9A, the application of the brake the left front wheel 22 induces changes in accelerations of the other three wheels 23 to 25 with time lags. In response to the application of the brake at timing T1, the change in acceleration of the right front wheel 3 occurs at timing T2 after timing T1. The change in acceleration of the left rear wheel 4 occurs at timing T3 after timing T2. The change in acceleration of the right rear wheel 5 occurs at timing T4 after timing T3.

The each of the sensors 7 to 10 outputs the data indicating the sensor ID assigned to the sensor, at the same timing when the change occurs in acceleration of the wheel to which the sensor is provided. Therefore, the receiver 44 of the TPMS control unit 41 receives the data 11 to 14 in that order at timing t1 to t4, respectively. The TPMS control unit 41 selects the left front wheel 2 as the wheel to be braked, and thereafter, generates the tire position table 51 in which the left front wheel 2 is associated with the sensor ID indicated by the left front wheel data 11 received at timing t1. As described above, the tire position concerned to the left front wheel 2 is identified. Thereafter, the tire positions concerned to the other wheels are automatically identified in the same manner.

Figure 10:
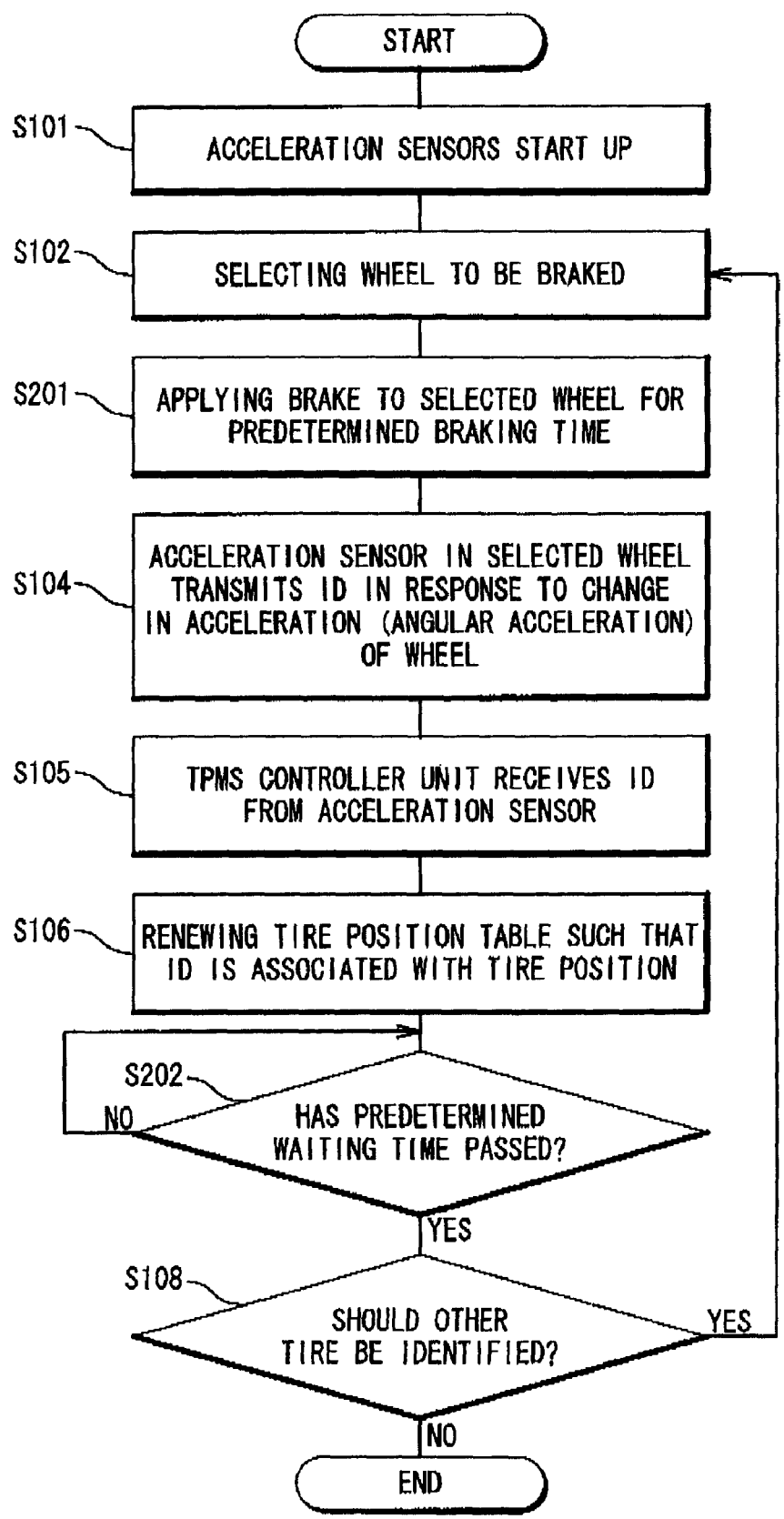
FIG. 10 is a flow chart illustrating another operation of the system according to the first embodiment.

In the operation illustrated in the flow chart described above, for example, the command for releasing the brake is outputted based on the renewal of the tire position table 51 or the like. In addition to such operation, the system for identifying tire position can automatically end the operation for identifying tire position when a predetermined braking time for applying the brake has elapsed. Hereinafter, another operation according to the present embodiment will be described referring to the drawings. FIG. 10 is a flow chart illustrating another operation executed by the system for identifying tire position according to the present embodiment. In FIG. 10, processes executed in each step designated by the same numeral shown in FIG. 8 are same as the processes executed in the corresponding step in FIG. 8.

Referring to FIG. 10, in step S101, the main body 1 rotates the wheels 2 to 5 to start running. In response to the start of rotation of the wheels 2 to 5, the sensors 7 to 10 start up. In step S102, the TPMS control unit 41 transmits data indicating the position of the selected wheel as a wheel to be braked and a command for braking only the selected wheel to the ABS controller 31. The position of the selected wheel means that the selected wheel is left front, right front, left rear or right rear wheel in the vehicle. The system proceeds to step S201 after the processes in step S102.

In step S201, the ABS controller 31, in response to the data and command, supplies to the actuator 32 a control signal for applying the brake to the selected wheel. Here, the ABS controller 31 controls the actuator 32 such that the actuator 32 applies the brake to the selected wheel for the predetermined braking time. The actuator 32, in response to the control signal, applies the brake to the selected wheel. Processes in steps S104 to S106 are the same as the processes described above. In these steps, the TPMS control unit 41 renews the tire position table 51. After the completion of renewal, the system proceeds to step S202.

In step S202, the TPMS control unit 41 monitors the passage of time to judge whether or not a predetermined waiting time has passed. Here, the predetermined waiting time is longer than the predetermined braking time indicated by the control signal which is outputted from the ABS controller 31 in step S201. If it is judged that the predetermined waiting time has not passed, the TPMS control unit 41 continues to monitor the passage of time. If it is judged that the predetermined waiting time has passed, the system proceeds to step S108. As described above, determining the time during which the brake is actually applied permits automatic release of the brake in accordance with the time passage.

Then, in step S108, the TPMS control unit 41 judges whether or not the identification of position is completed for the other wheels. When it is judged that the identification of position is not completed for at least one wheel, the system returns to the step S102. When it is judged that the identification of the position is completed for all of the wheels 2 to 5, the system ends the operation for identifying tire position.

It is preferable that the series of processes be executed upon starting of the engine of the vehicle. When the engine is stopped, the vehicle is also stopped, of course. The identification of tire position is executed around the time when the vehicle starts to run at a slow speed after the engine starts. Executing the identification of tire position at every start of running of the vehicle permits the tire position table 51 holding the latest information. The system according to the embodiment may include an input device provided in the vicinity of a seat of the vehicle. The system may execute the operation for identifying tire position in response to input from the input device.

If characteristics of the changes in accelerations of the braked wheel and the other wheels are known, the system can identify the positions of all the wheels without applying the brake to each of the four wheels 2 to 5. In this case, the number of wheels to be braked for the identification can be reduced depending on the characteristics concerned with the vehicle. For example, if the right front, left front, right rear and left rear wheels respond to the brake applied to the right front wheel in that order, the system can identify the position and ID for each of the four wheels by applying the brake to only one wheel.

The main body 1, on which the system for identifying tire position according to the present invention is mounted, can automatically recognize the positions of the plurality of wheels through the operation described above. Here, as described above, the cooperation between the ABS 20 and the TPMS 40 can provide the appropriate system for identifying tire position while suppressing cost increase. However, this does not mean that the ABS 20 and the TPMS 40 are indispensable to the system. For example, it is also possible to newly design a special processor, to provide the special processor in the main body 1 and to thereby constitute the system for identifying tire position.

The configuration and operation of the system for identifying tire position according to the present embodiment described above can be summarized below.

In one aspect of the present embodiment, the system includes wheels provided in a vehicle such as automobile, a rotation control mechanism connected to each of the wheels and controlling rotation of each of the wheels, a detector provided to each of the wheels and a processor section. The rotation control mechanism is, for example, a brake. The processor section is, for example, a computer mounted on the vehicle. A tire is mounted on each of the wheels. The detector preferably includes a velocity sensor or acceleration sensor. Each detector is preferably assigned with an ID for discrimination of one detector from the others. Here, each of the detectors, in response to a change in rotation of the corresponding wheel, transmits a data (hereinafter called as detection-target-wheel data) including the ID. The processor section receives the data including the ID from each of the detectors and identifies the position of each of the wheels (tires) based on the data.

More specifically, the processor section selects one from the positions of the wheels and specifies the selected position as a detection-target position. Then, the processor section commands the rotation control mechanism, which is connected to the wheel (herein after called as detection-target wheel) corresponding to the detection-target position, to change the rotation rate of the detection-target wheel. The rotation control mechanism connected to the detection-target wheel, in response to the command, changes the rotation rate of the detection-target wheel. Consequently, the detector, which is provided to the detection-target wheel, outputs the detection-target-wheel data, in response to the change in rotation rate of the detection-target wheel. That is, the detection-target-wheel data is outputted from the one specified wheel.

The processor section monitors data outputted from the detector provided to each of the wheel. The processor section receives data from the detectors in different timings. Therefore, the processor section, based on the order in which the data are received, can associate the detection-target-wheel data with the detection-target-position. As a result, the system according to the present invention can identify the position of the tire mounted on the wheel corresponding to the detection-target-position.

In the system according to the present embodiment, the processor section commands the rotation control mechanism, which is connected to the detection-target wheel, to apply the brake to the detection-target wheel. The rotation control mechanism, in response to the command (command for braking), reduces the acceleration of the detection-target wheel. Consequently, the detector, which is provided to the detection-target wheel, in response to the change in acceleration (deceleration) of the detection-target wheel, outputs braking-target-wheel data including the ID of this detector. Therefore, the system according to the present embodiment identifies the position of the tire by associating the command for braking from the processor section and the braking-target-wheel data outputted in response to the command.

The system according to the present embodiment can include a braking system (for example, ABS) and a tire pressure monitoring system (TPMS). In this case, it is preferable that the braking system includes rotation control mechanisms including brake drum, brake pads and the like and a brake controller controlling the rotation control mechanism. It is also preferable that the braking system controls independently the accelerations of the wheels provided in the vehicle. It is also preferable that the tire pressure monitoring system includes the air-pressure-data receiver unit, which receives the data from each of the detectors. It is also preferable that the tire pressure monitoring system monitors independently the air pressures of the tires on the wheels based on air-pressure data included in the data from each of the detectors.

The processor section described above can include the brake controller and the air-pressure-data receiver unit. Here, the air-pressure-data receiver unit supplies the brake controller with data indicating the detection-target-position. The brake controller stores a plurality of installation-position data each of which indicates the position in which one of the rotation control mechanisms is installed. Therefore, the brake controller, in response to reception of the data indicating the detection-target-position, reads the installation-position data corresponding to the detection-target-position. Then, the brake controller makes the rotation control mechanism, which is installed in the position indicated by the installation-position data, to apply the brake. Here, the detector provided to the detection-target wheel, in response to the change in acceleration of the detection-target wheel, outputs the braking-target-wheel data. Through such configuration and operation, effects of the present embodiment can be provided.

In the system according to the present embodiment, each of the wheels may be connected to the vehicle via a shock-absorbing mechanism (for example, suspension). In this case, the air-pressure-data receiver unit supplies the brake controller with the data indicating the detection-target-position. The brake controller, in response to reception of the data indicating the detection-target-position, makes the corresponding rotation control unit to apply the brake to the wheel corresponding to the detection-target-position. A force generated by applying the brake to the specified wheel is transmitted to the other wheels via the shock-absorbing mechanisms. Each of the wheels other than the detection-target wheel, in accordance with the force transmitted via the shock-absorbing mechanism, changes its acceleration. Thus, the wheels behave in different timings. The system according to the present embodiment, based on the timings, can identify the tire position.

The system according to the present embodiment may include an input device connected to the air-pressure-data receiver unit. In this case, the air-pressure-data receiver unit supplies the brake controller with the data indicating the detection-target position in response to a command for identifying tire position inputted to the system via the input device. The system according to the embodiment can be set to automatic mode and manual mode. When the system is set to the manual mode, the user makes the system to identify the tire positions at an arbitrary timing.

In another aspect of the present embodiment, the system for identifying tire position includes a plurality of wheels (2, 3, 4, 5), a plurality of detectors (7, 8, 9, 10) and a processor section. The wheels are provided in a vehicle. Each of the detectors is provided to one of the wheels. Each of the detectors is assigned with ID for identifying the detector. Preferably, each of the detectors outputs data including the ID in response to change in rotation of the wheel. The processor section specifies one of positions, in which the wheels are installed, as a detection-target position and reduces acceleration of the wheel corresponding to the detection-target position by making a brake to brake that wheel.

Then, the detector provided to the wheel corresponding to the detection-target position, in response to the change in acceleration of that wheel, outputs a brake-target-wheel data including the ID of that detector. The processor section (6) identifies the positions of the wheels (tires) based on the data by storing the ID indicated by the brake-target-wheel data and the detection-target position in association with each other, in response to the reception of the brake-target-wheel data.

Each of the detectors is assigned with ID. Each of the detectors, in response to the change in condition of the wheel (tire), informs the apparatus of information about the wheel (tire). The apparatus is provided in the main body of the vehicle. When the brake is applied only to the specified wheel (tire), each of the detectors transmits the data with the ID in different timings. The apparatus in the main body receives the data with the ID from each of the detectors in different timings. The system can automatically identify the positions of the wheels (tires mounted thereon), since the order of the receptions of the data are corresponds to the order of the transmission of the data.

The system according to the present embodiment can automatically identify the position of each of the tires at an arbitrary timings while suppressing cost increase.

It is apparent that the present invention is not limited to the above embodiments, but may be modified and changed without departing from the scope and spirit of the invention.

What is claimed is:

1. A system comprising:
    a first detector provided to a first wheel in a first position in a vehicle;
    a second detector provided to a second wheel in a second position in said vehicle; and
    a processor section,
    wherein said vehicle comprises a brake system configured to brake said first wheel in response to a signal designating said first position,
    said first detector is assigned with a first identifier and configured to output said first identifier to said processor section in response to a change in rotation of said first wheel,
    said second detector is assigned with a second identifier and configured to output said second identifier to said processor section in response to a change in rotation of said second wheel, and
    said processor section is configured to output said signal to said brake system, to associate said first identifier and a first position data indicating said first position and to identify a first tire mounted on said first wheel based on said first identifier.

2. The system according to claim 1, wherein said processor section is configured to store said first identifier and said first position data in association with each other.

3. The system according to claim 2, further comprising:
    a tire pressure monitoring system configured to monitor each of air pressures of said first tire and a second tire mounted on said second wheel,
    wherein said brake system is configured to control accelerations of said first wheel and said second wheel separately, and said change in rotation of said first wheel is a change in acceleration of said first wheel.

4. The system according to claim 3, wherein said vehicle includes shock-absorbing mechanisms, said first wheel and said second wheel are connected to said shock-absorbing mechanisms, and said vehicle is configured to permit a change in acceleration of said second wheel in response to a transmission of a force to said second wheel via said shock-absorbing mechanisms.

5. The system according to claim 4, further comprising:
an input device connected to said processor section,
wherein said processor section is configured to output said signal to said brake system in response to an input from said input device.

6. The system according to claim 1, wherein said brake system is configured to brake said first wheel without braking said second wheel in response to said signal, said process or section is configured to associate said first identifier and said first position data based on timings of receptions of said first identifier and said second identifier.

7. The system according to claim 6, wherein said first detector is configured to detect an air pressure of said first tire and to output a air pressure data indicating said air pressure with said first identifier to said processor section, and said processor section is configured to associate said air pressure data and said first position data.

8. A method comprising:
selecting a first position from positions in each of which a wheel of a vehicle is installed;
braking said wheel in said first position by a brake installed in said first position;
detecting a change in condition of said wheel in said first position in response to said braking;
transmitting a first identifier corresponding to said wheel in said first position in response to said detecting; receiving said first identifier;
storing said first identifier and a position data indicating said first position in association with each other; and
identifying a tire mounted on said wheel in said first position based on said first identifier.

9. The method according to claim 8, further comprising:
in response to said braking, detecting a change in condition of said wheel in a second position as one of said positions other than said first position;
transmitting a second identifier corresponding to said wheel in said second position in response to said detecting said change in condition of said wheel in said second position; and
receiving said second identifier,
wherein in said storing, storing said first identifier and said first position data in association with each other in case that said receiving said second identifier follows said receiving said first identifier.

10. A non-transitory computer-readable medium having stored therein a program for making a computer execute a method, said program including computer executable instructions for performing steps comprising:
selecting a first position from positions in each of which a wheel of a vehicle is installed;
braking said wheel in said first position by a brake installed in said first position;
detecting a change in condition of said wheel in said first position in response to said braking;
transmitting a first identifier corresponding to said wheel in said first position in response to said detecting; receiving said first identifier;
storing said first identifier and a position data indicating said first position in association with each other; and
identifying a tire mounted on said wheel in said first position based on said first identifier.

11. The non-transitory computer-readable medium having stored therein a program as defined in claim 10, the program further comprising:
in response to said braking, detecting a change in condition of said wheel in a second position as one of said positions other than said first position;
transmitting a second identifier corresponding to said wheel in said second position in response to said detecting said change in condition of said wheel in said second position; and
receiving said second identifier,
wherein in said storing, storing said first identifier and said first position data in association with each other in case that said receiving said second identifier follows said receiving said first identifier.

* * * * *